United States Patent
Chang et al.

(10) Patent No.: US 9,731,493 B2
(45) Date of Patent: Aug. 15, 2017

(54) PRINTING PLATFORM SUPPORTING MODULE AND THREE-DIMENSIONAL PRINTER USING SAME

(71) Applicant: Teco Image Systems Co., Ltd., Taipei (TW)

(72) Inventors: Yu-Jen Chang, Taipei (TW); Ken-Te Chou, Taipei (TW); Ting-Chun Chen, Taipei (TW); Chien-Ying Chen, Taipei (TW)

(73) Assignee: TECO IMAGE SYSTEMS CO., LTD., Taipei (TW)

( * ) Notice: Subject to any disclaimer, the term of this patent is extended or adjusted under 35 U.S.C. 154(b) by 116 days.

(21) Appl. No.: 14/850,573

(22) Filed: Sep. 10, 2015

(65) Prior Publication Data

US 2017/0043538 A1 Feb. 16, 2017

(30) Foreign Application Priority Data

Aug. 10, 2015 (TW) .............................. 104126010 A

(51) Int. Cl.
*B29C 67/00* (2017.01)
*B33Y 30/00* (2015.01)
*B33Y 40/00* (2015.01)
*B33Y 50/02* (2015.01)

(52) U.S. Cl.
CPC .......... *B33Y 30/00* (2014.12); *B29C 67/0055* (2013.01); *B29C 67/0085* (2013.01); *B29C 67/0051* (2013.01); *B29C 67/0059* (2013.01); *B33Y 40/00* (2014.12); *B33Y 50/02* (2014.12)

(58) Field of Classification Search
CPC ............ B29C 67/0051; B29C 67/0055; B29C 67/0059; B29C 67/0085; B33Y 30/00; B33Y 40/00; B33Y 50/02
USPC ......................................................... 425/375
See application file for complete search history.

(56) References Cited

U.S. PATENT DOCUMENTS

| 2015/0165687 A1* | 6/2015 | Ho ...................... B29C 67/0088 425/144 |
| 2016/0052207 A1* | 2/2016 | Bloom ................ B29C 67/0085 425/3 |
| 2016/0193788 A1* | 7/2016 | Din ..................... B29C 67/0055 425/150 |

(Continued)

FOREIGN PATENT DOCUMENTS

| CN | 203805320 | 9/2014 |
| TW | M479219 | 6/2014 |

*Primary Examiner* — Matthew Daniels
*Assistant Examiner* — Lawrence D Hohenbrink, Jr.
(74) *Attorney, Agent, or Firm* — Kirton McConkie; Evan R. Witt

(57) ABSTRACT

The present disclosure relates to a printing platform supporting module and a three-dimensional printer using same. The printing platform supporting module comprises a supporting frame, the printing platform, a heating assembly, an adjusting module, and a printing plate. The heating assembly is disposed on the printing platform. The adjusting module is disposed on the printing platform and comprises a plurality of locking units. The printing plate has a working surface and a mounting surface opposite to the working surface. The mounting surface is urged against the heating assembly. The printing plate is removably disposed on the printing platform by means of a locking action and an unlocking action of the locking units.

17 Claims, 6 Drawing Sheets

(56) References Cited

U.S. PATENT DOCUMENTS

2016/0297110 A1* 10/2016 Wu .................... B29C 35/16

* cited by examiner

PRINTING PLATFORM SUPPORTING MODULE AND THREE-DIMENSIONAL PRINTER USING SAME

CROSS-REFERENCE TO RELATED APPLICATION

This application claims priority from Taiwan Patent Application No. TW 104126010, filed on Aug. 10, 2015, the entire contents of which are incorporated herein by reference for all purposes.

FIELD OF THE INVENTION

The present invention relates to a printing platform supporting module and a three-dimensional printer, and more particularly to a printing platform supporting module with an adjustable and detachable printing plate and a three-dimensional printer using the same.

BACKGROUND OF THE INVENTION

In recent years, with the upgrading of industrial technology, the cost of three-dimensional printing is reduced and the three-dimensional printers become more common and public. In the conventional three-dimensional printer, a printing platform is fixed on the machine for preventing the printing platform from loose or displacement due to the vibration during the printing operations. Moreover, a heating device and a temperature sensor are usually fixed on the printing platform for facilitating to take out the printed product, and there should be a lot of wires connected to the heating device and the temperature sensor. Therefore, the printing platform is securely fixed on the machine of the conventional three-dimensional printer.

However, for utilizing the space efficiently and decreasing the cost of the three-dimensional printer, the inner operating space of the conventional three-dimensional printer is minimized. Consequently, it is not convenient to perform several operations of taking out the printed product from the inner operating space, cleaning the printing platform, or changing the attached film. In addition, it will take more time to perform the above operations, and the next step of printing new model may be delayed and won't be operated efficiently.

Furthermore, in the conventional three-dimensional printer, there is no simple and reliable adjusting module used for adjusting the degree of parallelism between the printing platform and the movement plane of printhead. If the printing platform and the movement plane of printhead are not parallel, there should be minor flaws formed in the printed product.

Therefore, there is a need of providing a printing platform supporting module and a three-dimensional printer using the same for improving and overcoming the drawbacks encountered by the prior arts.

SUMMARY OF THE INVENTION

An object of the present invention provides a three-dimensional printer and a printing platform supporting module thereof. A detachable printing plate and a plurality of adjustable locking units are employed in the printing platform supporting module, so that the drawbacks of performing several time-consuming operations to take out the printed product from the inner operating space, cleaning the printing platform, or changing the attached film can be overcome, and the next step of printing new model could be performed efficiently.

Another object of the present invention provides a three-dimensional printer and a printing platform supporting module thereof. A detachable printing plate and a plurality of adjustable locking units are employed in the printing platform supporting module for adjusting the degree of parallelism between the printing platform and a movement plane of the printhead. Therefore, the printing platform and the movement plane of the printhead are parallel, and the printed product could be produced without any minor flaw.

In accordance with an aspect of the present invention, a printing platform supporting module for a three-dimensional printer is provided. The printing platform supporting module comprises a supporting frame, a printing platform, a heating assembly, an adjusting module and a printing plate. The printing platform is fixed on the supporting frame. The heating assembly is disposed on the printing platform. The adjusting module is disposed on the printing platform and comprises a plurality of locking units. The printing plate has a working surface and a mounting surface opposed to the working surface, wherein the mounting surface is urged against the heating assembly, and the printing plate is removably disposed on the printing platform by means of a locking action and an unlocking action of the locking units.

In accordance with another aspect of the present invention, a three-dimensional printer is provided. The three-dimensional printer comprises a base, a frame assembly, a driving module, a printhead, and a printing platform supporting module. The frame assembly is fixed on the base. The driving module is disposed on the frame assembly. The printhead is connected with the driving module, and the driving module drives the printhead to move. The printing platform supporting module comprises a supporting frame, a printing platform, a heating assembly, an adjusting module and a printing plate. The printing platform is fixed on the supporting frame. The heating assembly is disposed on the printing platform. The adjusting module is disposed on the printing platform and comprises a plurality of locking units. The printing plate has a working surface and a mounting surface opposed to the working surface, wherein the mounting surface is urged against the heating assembly, and the printing plate is removably disposed on the printing platform by means of a locking action and an unlocking action of the locking units.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
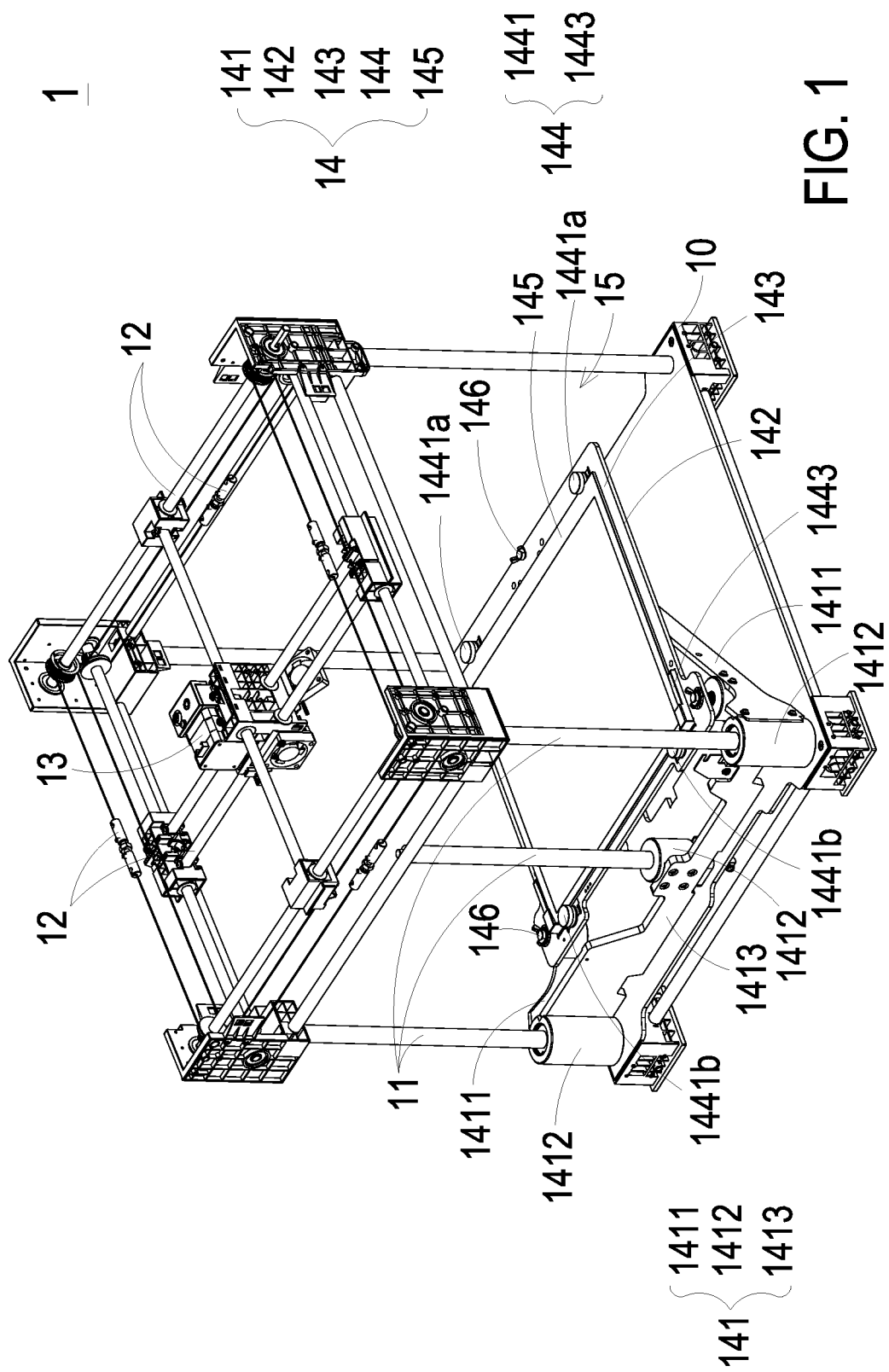
FIG. 1 schematically illustrates a three-dimensional printer according to an embodiment of the present invention.

FIG. 1 schematically illustrates a three-dimensional printer according to an embodiment of the present invention. As shown in FIG. 1, the three-dimensional printer 1 comprises a base 10, a frame assembly 11, a driving module 12, a printhead 13, and a printing platform supporting module 14. The frame assembly 11 is fixed on the base 10. The driving module 12 is disposed on the frame 11, and an inner operating space 15 is defined by the base 10, the frame assembly 11, and the driving module 12. The printhead 13 is connected with the driving module 12, and the printhead 13 is enabled to move by the driving module 12. Namely, the driving module 12 drives the printhead 13 to move. Consequently, the printhead 13 can be selectively moved to an assigned position within the inner operating space 15. The printing platform supporting module 14 comprises a supporting frame 141, a printing platform 142, a heating assembly 143, an adjusting module 144 and a printing plate 145. The supporting frame 141 is movably disposed on the frame assembly 11, and the supporting frame 141 can be raised up or lowered down along the frame assembly 11 and fixed at a suitable height relative to the frame assembly 11. The printing platform 142 includes a plurality of first disposing holes 1421 and a plurality of second disposing holes 1422 (see FIG. 2), and the printing platform 142 is disposed and fixed on the supporting frame 141 via the first disposing holes 1421. In this embodiment, the supporting frame 141 includes two holding arms 1411, three slider 1412, and a cross girder 1413. Three slider 1412 are sleeves and put on corresponding portions of the frame assembly 11, respectively, and the three slider 1412 are connected by the cross girder 1413. Two holding arms 1411 are connected with two sliders 1412 disposed on the two lateral sides, respectively. The printing platform 142 is fixed and supported by the two holding arms 1411 of the supporting frame 141, and the printing platform 142 is adjustably raised up and lowered down accompanied with the movement of the supporting frame 141. Preferably but not exclusively, the three-dimensional printer 1 is a fused deposition modeling (FDM) three-dimensional printer. The driving module 12 is a steel wire transmission system. The printhead 13 is enabled to move by the steel wire transmission system toward an assigned position, and then the plastic raw material is heated and pressed to be deposed on the printing plate 145.

Figure 2:
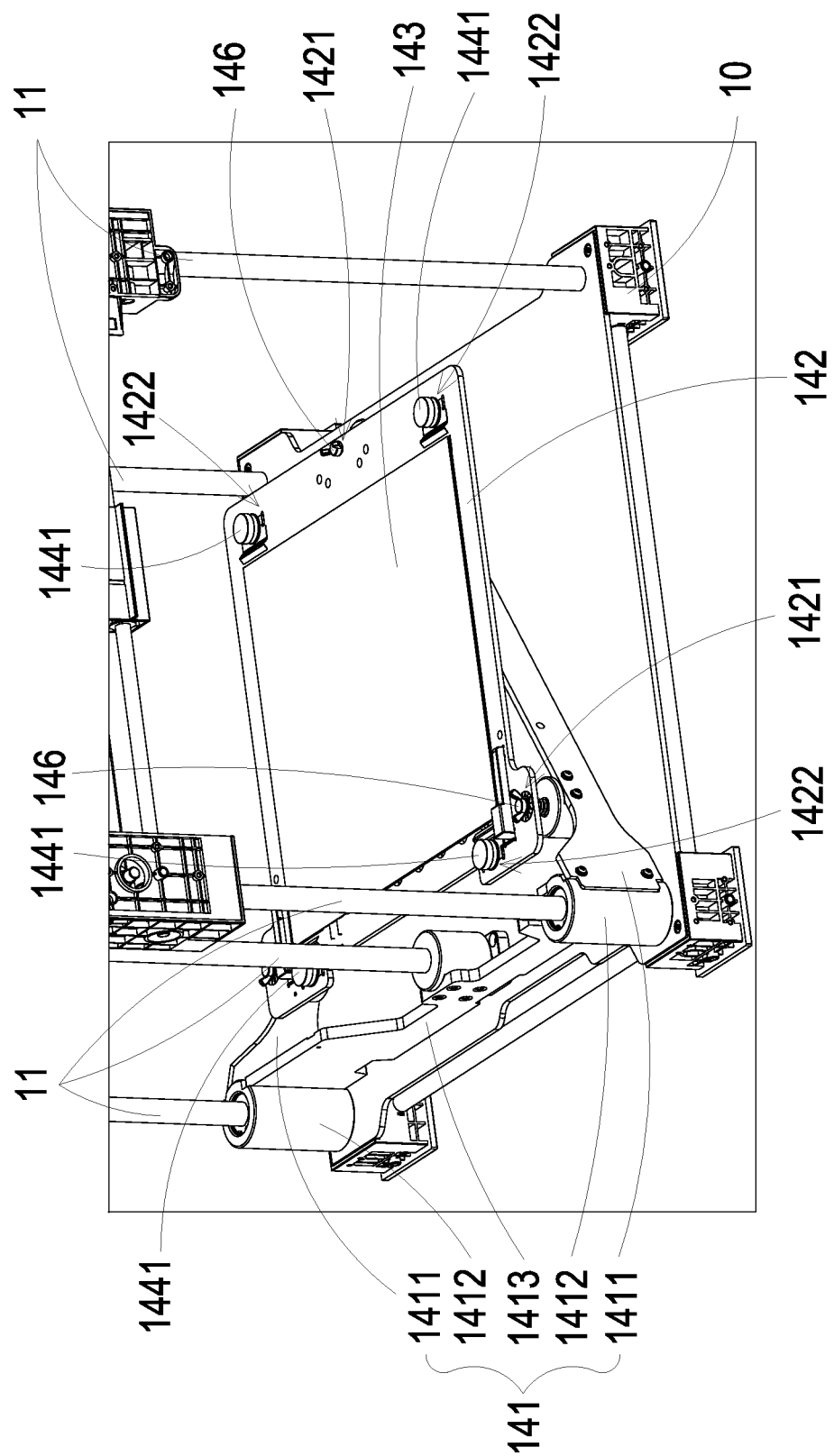
FIG. 2 schematically illustrates a partial structure of the three-dimensional printer of FIG. 1.

Please further refer to FIGS. 1 and 2, wherein FIG. 2 schematically illustrates a partial structure of the three-dimensional printer of FIG. 1. For illustrating the structure of the heating assembly 143 clearly, the printing plate 145 of FIG. 2 is detached. In this embodiment, the heating assembly 143 is disposed on the printing platform 142, and the heating assembly 143 is adhered on the printing platform 142 by means of adhesives, but it is not limited. The adjusting module 144 comprises a plurality of locking units 1441, and each of the locking units 1441 is coupled with a corresponding second disposing hole 1422. Consequently, the locking units 1441 are disposed and fixed on specific positions of the printing platform 142, respectively.

Figure 3A:
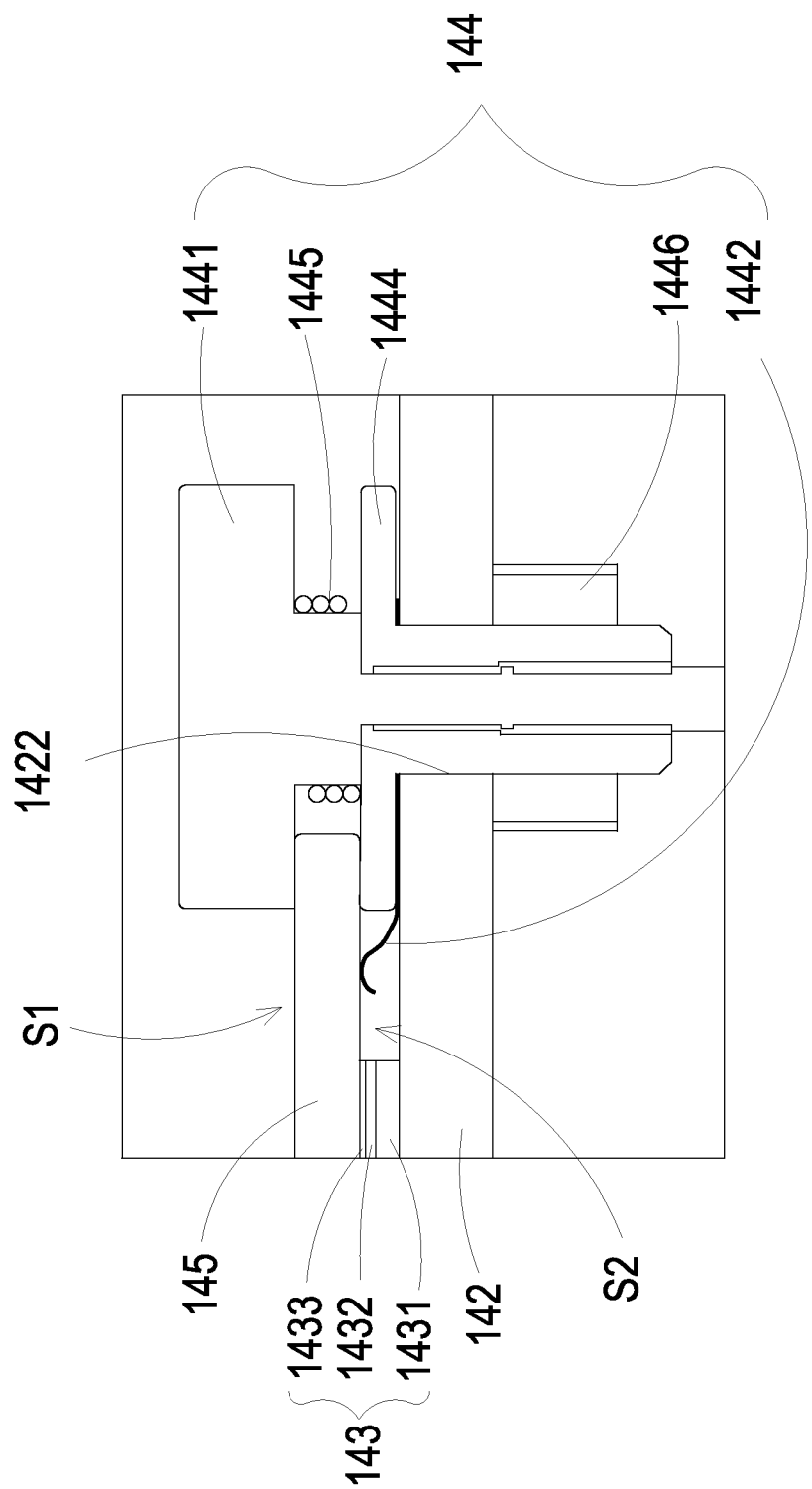
FIG. 3A is a cross-sectional view showing a locking action of a locking unit of the three-dimensional printer of FIG. 1.
Figure 3B:
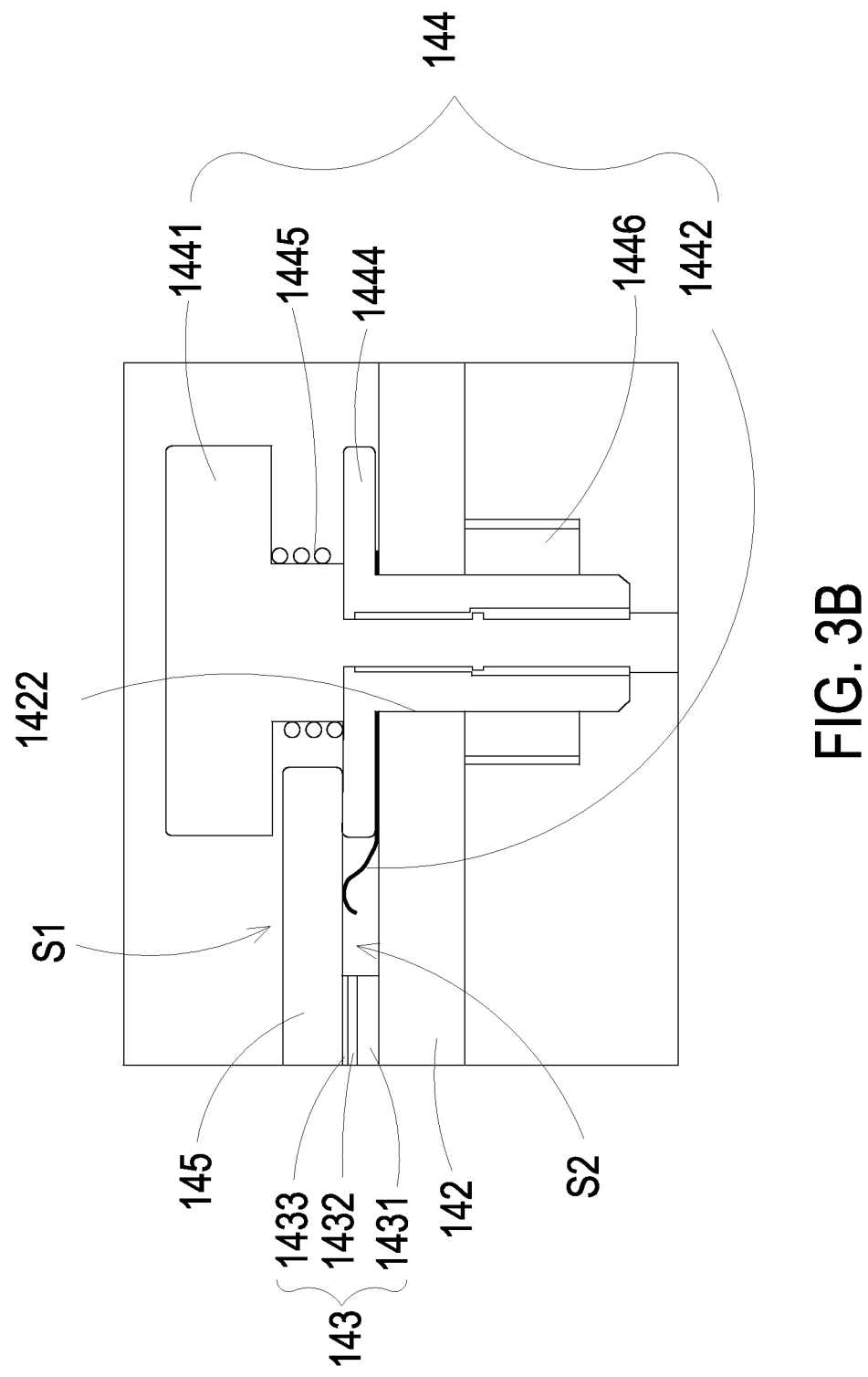
FIG. 3B is a cross-sectional view showing an unlocking action of the locking unit of the three-dimensional printer of FIG. 1.

Please refer to FIGS. 1, 3A and 3B, wherein FIG. 3A is a cross-sectional view showing a locking action of a locking unit of the three-dimensional printer of FIG. 1, and FIG. 3B is a cross-sectional view showing an unlocking action of the locking unit of the three-dimensional printer of FIG. 1. The printing plate 145 has a working surface S1 and a mounting surface S2 opposed to the working surface S1. The working surface S1 is corresponding to the printhead 13 for supporting a piece of printed model during printing or a printed product. The mounting surface S2 is urged against the heating assembly 143, and the printing plate 145 is supported by the heating assembly 143. Consequently, the printing plate 145 is in contact with the heating assembly 143 completely for being heated efficiently. In this embodiment, the heating assembly 143 includes a temperature sensor (not shown), and temperature sensor is in contact with the printing plate 145 completely. Consequently, the temperature sensor is able to detect the temperature of the printing plate 145 accurately. As shown in FIGS. 1 and 3A, when each of the locking units 1441 is adjusted to a first position, the working surface S1 of the printing plate 145 is urged against the locking units 1441. Consequently, the printing plate 145 is fixed on the printing platform 142. As shown in FIGS. 1 and 3B, when each of the locking units 1441 is adjusted to a second position, the working surface S1 of the printing plate 145 and the locking units 1441 are separated apart from each other, and the printing plate 145 is removable from the printing platform 142. In other words, the printing plate 145 is removably disposed on the printing platform 142 by means of a locking action and an unlocking action of the locking units 1441. For example, when two locking units 1441a disposed on a first side of the printing platform 142 as shown in FIG. 1 are adjusted to the second position as shown in FIG. 3B, and two locking units 1441b disposed on a second side opposite to the first side of the printing platform 142 as shown in FIG. 1 are kept in the first position as shown in FIG. 3A, the printing plate 145 can be removed easily.

As shown in FIG. 3A, in this embodiment, the heating assembly 143 includes a buffer pad 1431, an insulating plate 1432, and a heating plate 1433. The buffer pad 1431 is disposed on the printing platform 142. The insulating plate 1432 is attached on the buffer pad 1431. The heating plate 1433 is a thin and flexible heating plate and attached on the insulating plate 1432 for facilitating the heating plate 1433 to be spread widely. It is noted that the elements included in the heating assembly 143 are not limited to the elements as described in the above embodiment. In another embodiment, the buffer pad 1431 is formed by heat-resistant materials. Under this circumstance, the heating plate 1433 could be attached to the buffer pad 1431 directly. Preferably but not exclusively, the buffer pad 1431 is formed by elastic materials. In some embodiment, the buffer pad 1431 is formed by polymer materials, and the printing plate 145 is formed by a glass, but it is not limited. When the printing plate 145 is disposed on the heating assembly 143 and the locking units 1441 are adjusted to the first position, the buffer pad 1431 is elastically compressed so as to push the heating plate 1433 to urge against the mounting surface S2 of the printing plate 145.

Figure 4:
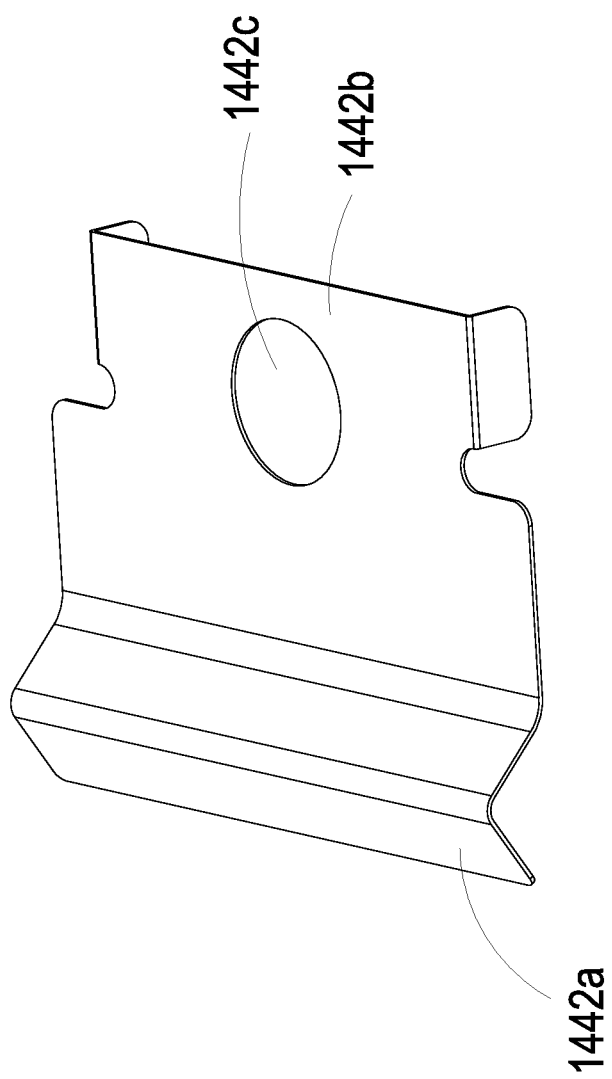
FIG. 4 schematically illustrates an elastic panel of the adjusting module of FIG. 1.

Please refer to FIGS. 3A, 3B and 4, wherein FIG. 4 schematically illustrates an elastic panel of the adjusting module of FIG. 1. The adjusting module 144 further comprises a plurality of elastic panels 1442. Each elastic panel 1442 has a bending part 1442a and a main body 1442b. Each main body 1442b of the elastic panels 1442 has a through hole 1442c, and the through hole 1442c is aligned and coupled with a corresponding second disposing hole 1422. Moreover, the bending parts 1442a of the elastic panels 1442 are urged against the mounting surface S2 of the printing plate 145, so that the printing plate 145 is pushed to urge against the locking units 1441 by the elastic panels 1442. Under this circumstance, the degree of parallelism between the working surface S1 of the printing plate 145 and a movement plane of the printhead 13 can be adjusted by means of adjusting the positions of the locking units 1441. When parts of the locking units 1441 are adjusted to an optimum position, respectively, the working surface S1 of the printing plate 145 is parallel to the movement plane of the printhead 13 of the three-dimensional printer 1, so that the printed product can be produced without minor flaws. In other words, if each of the locking units 1441 is adjusted to a first position and the working surface S1 of the printing plate 145 is not in parallel with the movement plane of the printhead 13, parts of the locking units 1441 can be further adjusted to required positions by the user so as to adjust the inclination angle of the working surface S1 of the printing plate 145 relative to the printing platform 142. In the embodiment, the adjusting module 144 includes but not limited to four locking units 1441. Consequently, the working surface S1 of the printing plate 145 can be adjusted to be in parallel with the movement plane of the printhead 13 approximately by an easier and quick method. Alternatively, the adjusting module 144 includes three locking units 1441, so that the cost can be saved. Alternatively, the adjusting module 144 includes five locking units 1441 or six locking units 1441, so that the printing plate 145 can be secured more stably.

Please refer to FIGS. 1 and 2, again. The adjusting module 144 further includes a plurality of guiding tracks 1443. Preferably, the adjusting module 144 includes two guiding tracks 1443, and the two guiding tracks 1443 are disposed on two opposite sides of the printing platform 142 respectively for guiding and limiting the movement of the printing plate 145 and assisting the printing plate 145 to be mounted.

Please refer to FIGS. 3A and 3B, again. The adjusting module 144 further includes a plurality of holders 1444 and a plurality of springs 1445. Each of the holders 1444 is disposed in a corresponding second disposing hole 1422 and conjugated with a corresponding nut 1446 for preventing from loose of the holder 1444. Preferably, each of the locking units 1441 is coupled with a corresponding holder 1444. The elastic panel 1442 is securely fixed on the printing plate 145 via the holder 1444 inserted into the second disposing hole 1422, and the spring 1445 is disposed and kept stably between locking unit 1441 and the holder 1444, so that loose of the elastic panel 1442 and the spring 1445 can be prevented while the three-dimensional printer 1 is operated. Furthermore, each of the springs 1445 is disposed between the corresponding holder 1444 and the corresponding locking unit 1441 and urged against the corresponding locking unit 1441 and the corresponding holder 1444. Under this circumstance, the spring 1445 is elastically compressed and a restoring force is exerted by the spring 1445 for decreasing the influences caused by screw thread gaps between the holder 1444 and the locking unit 1441 while the locking units 1441 are adjusted. Consequently, the parallelism between the printing plate 145 and the movement plane of printhead 13 can be adjusted precisely.

Figure 5:
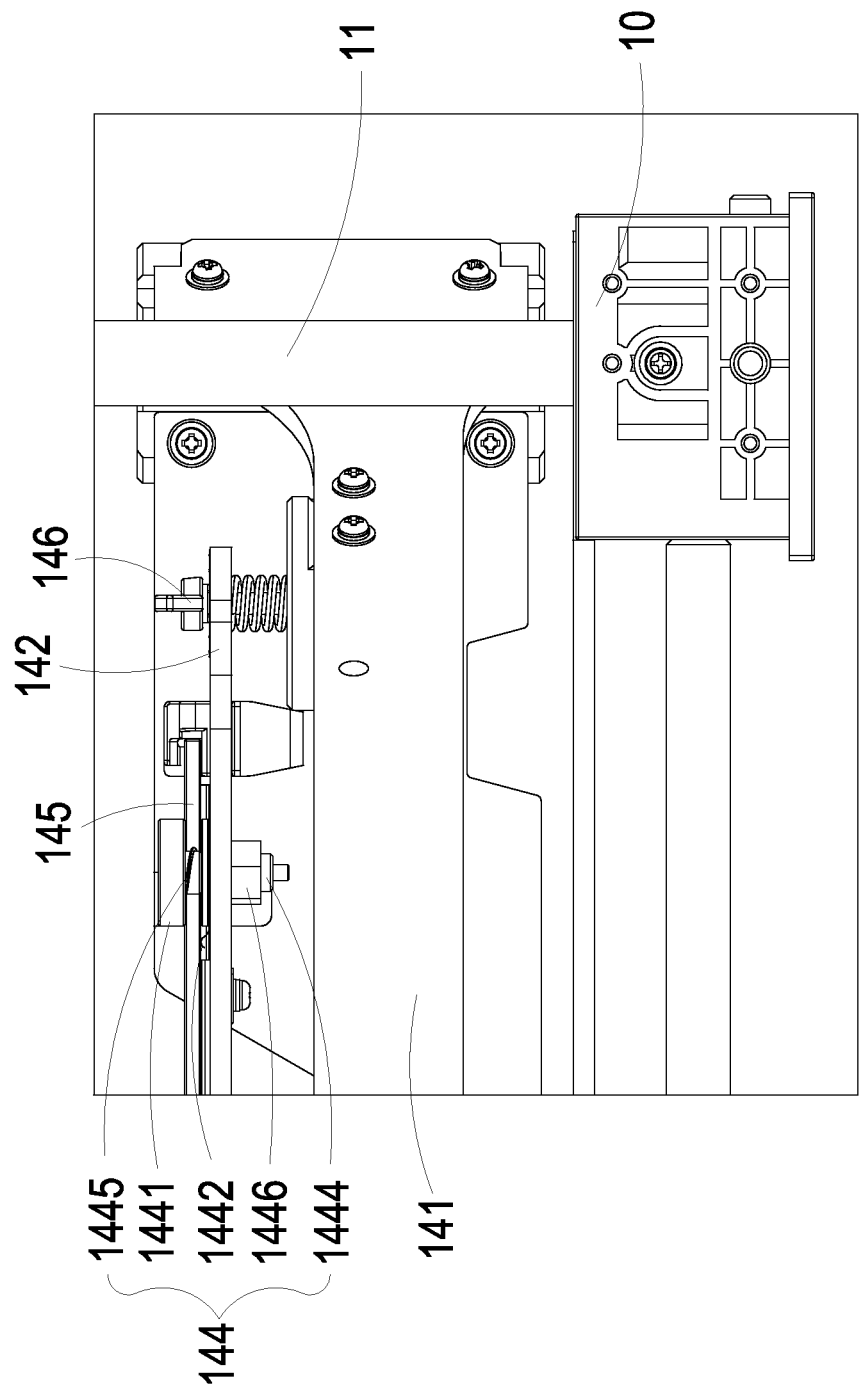
FIG. 5 schematically illustrates a partial structure of the three-dimensional printer of FIG. 1.

FIG. 5 schematically illustrates a partial structure of the three-dimensional printer of FIG. 1. As shown in FIG. 5, in this embodiment, the printing platform supporting module 14 further comprises a plurality of fixing screws 146, and each of the fixing screws 146 is coupled with a corresponding first disposing hole 1421 and the supporting frame 141 for fixing the printing platform 142 on the supporting frame 141. Preferably but not exclusively, the printing platform supporting module 14 comprises three fixing screws 146. In an embodiment, two of the three fixing screws 146 are employed to fasten the printing platform 142 on one holding arm 1411, and one of the three fixing screw 145 is employed to fasten the printing platform 142 on the other holding arm 1411.

To sum up, the present invention provides a printing platform supporting module and a three-dimensional printer using the same. An adjustable and detachable printing plate is employed in the printing platform supporting module, so that the drawbacks of performing several time-consuming operations to take out the printed product from the inner operating space, cleaning the printing platform, or changing the attached film can be overcome, and the next step of printing new model could be performed efficiently. On the other hand, the adjustable and detachable printing plate is employed in the printing platform supporting module to adjust the degree of parallelism between the printing plate and a movement plane of the printhead. Therefore, the printing platform and the movement plane of the printhead are parallel, and the printed product could be produced without any minor flaw.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A printing platform supporting module for a three-dimensional printer, the printing platform supporting module comprising:
   a supporting frame;
   a printing platform fixed on the supporting frame;
   a heating assembly disposed on the printing platform, wherein the heating assembly comprises:
      a buffer pad disposed on the printing platform;
      an insulating plate attached on the buffer pad; and
      a heating plate attached on the insulating plate, wherein the buffer pad is elastically compressed and configured to push the heating plate to urge against the mounting surface of the printing plate;
   an adjusting module disposed on the printing platform and comprising a plurality of locking units; and
   a printing plate having a working surface and a mounting surface opposite to the working surface, wherein the mounting surface is urged against the heating assembly, and the printing plate is removably disposed on the printing platform by means of a locking action and an unlocking action of the locking units.

2. The printing platform supporting module according to claim 1, wherein when each of the locking units is adjusted to a first position, the working surface of the printing plate is urged against the locking units, and the printing plate is fixed on the printing platform; and when each of the locking units is adjusted to a second position, the working surface of the printing plate is separated from the locking units, and the printing plate is removable from the printing platform.

3. The printing platform supporting module according to claim 1, wherein when parts of the locking units are adjusted to an optimum position, respectively, the working surface of the printing plate is parallel to a movement plane of a printhead of the three-dimensional printer.

4. The printing platform supporting module according to claim 1, wherein the printing plate is formed by a glass.

5. The printing platform supporting module according to claim 1, wherein the printing platform comprises a plurality of first disposing holes and a plurality of fixing screws, each of the fixing screws is coupled with a corresponding first disposing hole and the supporting frame for fixing the printing platform on the supporting frame.

6. The printing platform supporting module according to claim 1, wherein the adjusting module further comprises a plurality of guiding tracks disposed on two opposite sides of the printing platform for guiding and limiting the movement of the printing plate.

7. The printing platform supporting module according to claim 5, wherein the printing platform further comprises a plurality of second disposing holes, and the adjusting module further comprises a plurality of elastic panels, wherein each of the elastic panels has a bending part and a main body, each main body of the elastic panels is coupled with a corresponding second disposing holes, and the mounting surface of the printing plate is urged against the bending parts of the elastic panels.

8. The printing platform supporting module according to claim 7, wherein the adjusting module further comprises:
　a plurality of holders, each of the holders being disposed in a corresponding second disposing hole; and
　a plurality of springs, each of the locking units is coupled with a corresponding holder, each of the springs is disposed between a corresponding locking unit and a corresponding holder for urging against the corresponding locking unit and the corresponding holder.

9. A printing platform supporting module for a three-dimensional printer, the printing platform supporting module comprising:
　a supporting frame;
　a printing platform fixed on the supporting frame;
　a heating assembly disposed on the printing platform, wherein the heating assembly comprises:
　　a buffer pad disposed on the printing platform; and
　　a heating plate attached on the buffer pad,
　　wherein the buffer pad is elastically compressed and configured to push the heating plate to urge against the mounting surface of the printing plate;
　an adjusting module disposed on the printing platform and comprising a plurality of locking units; and
　a printing plate having a working surface and a mounting surface opposite to the working surface, wherein the mounting surface is urged against the heating assembly, and the printing plate is removably disposed on the printing platform by means of a locking action and an unlocking action of the locking units.

10. A three-dimensional printer, comprising:
　a base;
　a frame fixed on the base;
　a driving module disposed on the frame;
　a printhead connected with the driving module and enabled to move by the driving module; and
　a printing platform supporting module comprising:
　　a supporting frame;
　　a printing platform fixed on the supporting frame;
　　a heating assembly disposed on the printing platform, wherein the heating assembly comprises:
　　　a buffer pad disposed on the printing platform;
　　　an insulating plate attached on the buffer pad; and
　　　a heating plate attached on the insulating plate,
　　　wherein the buffer pad is elastically compressed and configured to push the heating plate to urge against the mounting surface of the printing plate;
　　an adjusting module disposed on the printing platform and comprising a plurality of locking units; and
　　a printing plate having a working surface and a mounting surface opposite to the working surface, wherein the mounting surface is urged against the heating assembly, and the printing plate is removably disposed on the printing platform by means of a locking action and an unlocking action of the locking unit.

11. The three-dimensional printer according to claim 10, wherein when each of the locking units is adjusted to a first position, the working surface of the printing plate is urged against the locking units, and the printing plate is fixed on the printing platform; and when each of the locking units is adjusted to a second position, the working surface of the printing plate is separated from the locking units, and the printing plate is removable from the printing platform.

12. The three-dimensional printer according to claim 10, wherein when parts of the locking units are adjusted to an optimum position, respectively, the working surface of the printing plate is parallel to a movement plane of the printhead.

13. The three-dimensional printer according to claim 10, wherein the printing plate is formed by a glass.

14. The three-dimensional printer according to claim 10, wherein the printing platform comprises a plurality of first disposing holes and a plurality of fixing screws, each of the fixing screws is coupled with a corresponding first disposing hole and the supporting frame for fixing the printing platform on the supporting frame.

15. The three-dimensional printer according to claim 10, wherein the adjusting module further comprises a plurality of guiding tracks disposed on two opposite sides of the printing platform for guiding and limiting the movement of the printing plate.

16. The three-dimensional printer according to claim 14, wherein the printing platform further comprises a plurality of second disposing holes, and the adjusting module further comprises a plurality of elastic panels, wherein each of the elastic panels has a bending part and a main body, each main body of the elastic panels is coupled with a corresponding second disposing holes, and the mounting surface of the printing plate is urged against the bending parts of the elastic panels.

17. The three-dimensional printer according to claim 16, wherein the adjusting module further comprises:
　a plurality of holders, each of the holders being disposed in a corresponding second disposing hole; and
　a plurality of springs, each of the locking units is coupled with a corresponding holder, each of the springs is disposed between a corresponding locking unit and a corresponding holder for urging against the corresponding locking unit and the corresponding holder.

\* \* \* \* \*